Patented June 10, 1924.

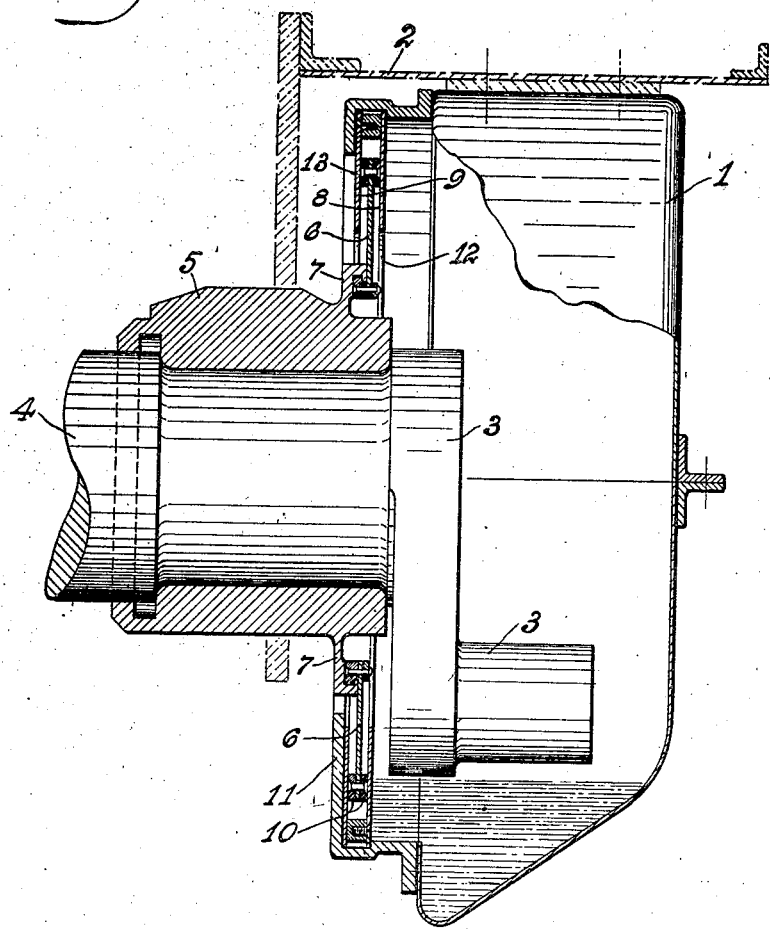

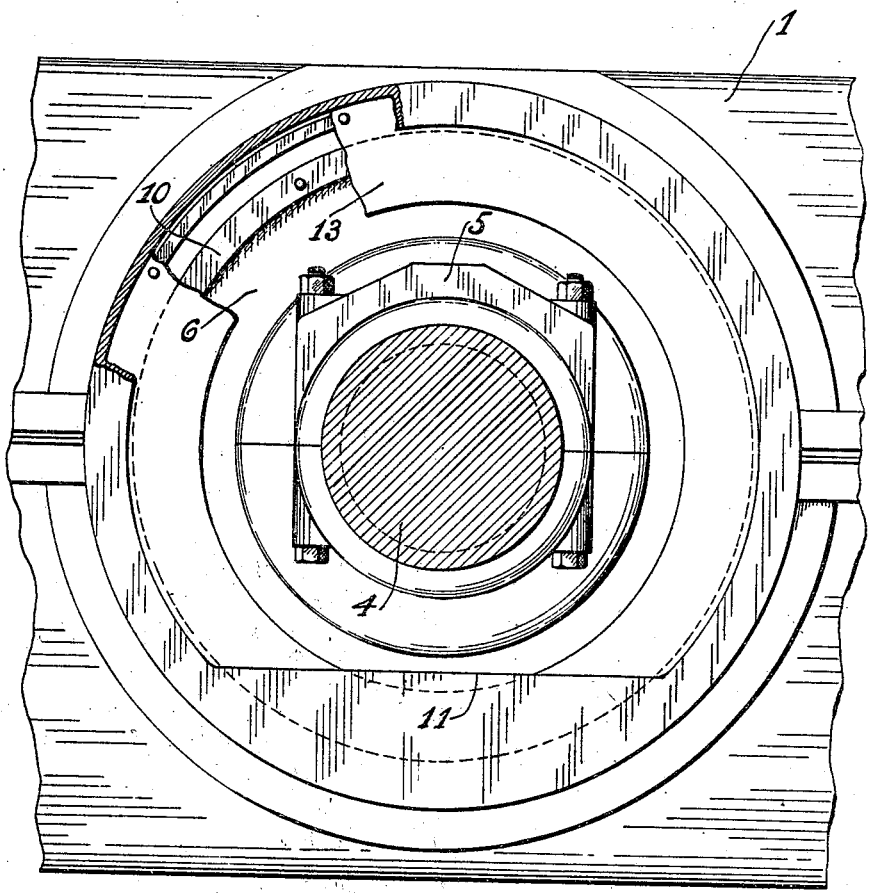

1,497,376

UNITED STATES PATENT OFFICE.

FREDRIK LJUNGSTRÖM, OF BREVIK, LIDINGON, AND ISIDOR BROBERG, OF TALLHYDDAN, SKARSATRA, LIDINGON, SWEDEN, ASSIGNORS TO AKTIEBOLAGET LJUNGSTRÖMS ANGTURBIN, OF STOCKHOLM, SWEDEN, A CORPORATION.

PACKING DEVICE.

Application filed August 29, 1922. Serial No. 585,095.

*To all whom it may concern:*

Be it known that we, FREDRIK LJUNGSTRÖM, chief engineer, and ISIDOR BROBERG, engineer, subjects of the King of Sweden, residing at Brevik, Lidingon, Sweden, and Tallhyddan, Skarsatra, Lidingon, Sweden, have invented certain new and useful Improvements in Packing Devices, of which the following is a specification.

Devices have previously been suggested the object of which is to improve the lubrication of the connecting rod appliances and similar parts of locomotives. In these constructions the movable parts of the locomotive are surrounded by casings adapted to collect the oil flowing down from the different points of lubrication, the different parts obtaining lubricating oil from a pressure pump system. Besides it has been suggested to fix said casings or oil boxes to the frame work of the locomotive. In this case it has however proved difficult to provide packings between said casings and the driving wheels of the locomotive, because of the frame work being supported elastically by the driving wheels which results in a movement of the casings in relation to the driving wheels. Owing thereto the packings must necessarily be so constructed that said movements may take place without allowing oil or impurities to pass through the packings. Besides such a packing has to be very durable and should not be depending upon exact adjustment. Since also the carriage may possess a certain elasticity causing oblique positions of the shaft of the driving wheel relative to the casing, the packing should allow also such movements.

This invention relates to a packing device between a casing surrounding the connecting rod appliance of a locomotive and the shafts of the driving wheels or parts appertaining thereto, said device consisting in a flexible or articulated diaphragm or similar disk slidable between the casing and the driving wheel shaft. According to an embodiment of the invention the flexible diaphragm is fixed to the driving wheel shaft or parts appertaining thereto, the outer edge of the diaphragm having such a shape that the diaphragm by bearing against one or more parts appertaining to the casing is slidable in relation to the casing.

The annexed drawing illustrates an embodiment of the invention. Fig. 1 is a sectional view of the packing device and Fig. 2 a side view of the same.

Referring to Fig. 1, 1 designates an oil box or casing fixed to the frame work 2 of the locomotive and surronding the connecting rod appliance 3. As the oil box 1 is supported elastically by the aid of the frame work 2, movements will arise, owing to the springy action of the carriage, between the oil box and the driving wheel shaft 4 or parts belonging thereto, said movements taking place substantially in the plane of the drawing.

In the embodiment shown the tightening is effected by a flexible diaphragm 6 being fixed to the bearing 7 of the driving shaft. Attached to the casing are the outer edges of turned rings or disks 12 and 13, provided with sliding surfaces 8 and 9 respectively coacting with rings 10 fixed to the outer edge of the diaphragm 6. If a movement in relation to the framework and the casing be imparted to the driving wheel shaft in parallel to the same, the rings 10 provided on the diaphragm 6 will slide in the U-shaped interspace between the sliding surfaces 8 and 9. If another angular position be imparted to the driving wheel shaft, as for instance in the plane of the drawing, the diaphgram 6 will be bent and possibly slide on the sliding surfaces 8 and 9. Consequently this packing will allow all movements of the driving wheel shaft in relation to the casing, because of the diaphragm being flexible in all directions.

Of course other embodiments may be imagined in which the diaphragm bears only against a single sliding surface. In the embodiment shown two sliding surfaces are however used for the purpose of obtaining a better tightening, since in case of a single sliding surface being used, the diaphragm is caused to bear against the sliding surface only by the aid of a springy action. If the oil boxes are intended to collect oil, the casing is preferably provided at the lower edge of the packing with a part 11 projecting above the level of the oil and preventing the oil from forcing its way out of the box, in case the oil from any reason has passed past the sliding surfaces. In most cases however the casing surrounding the connecting rod appliance is so constructed that said appliance together with coupling rods in the lowermost position is immersed into the oil, the movable parts in the box thus being lubricated by spraying the oil. Such a use of the oil box requires an effective packing round the whole driving shaft, which object is also attained by means of the present invention. Since the diaphragm ought to have the shape of an undivided broad ring, its inner diameter should be of such a magnitude that the same, when the diaphragm is mounted, may be slid on to the connecting rod appliance 3.

Other embodiments may be imagined without deviating from the principle of the invention. Thus for instance the flexible diaphragm may be fixed to the casing but slidable in relation to the parts of the driving wheel shaft. The diaphragm may also be replaced by a flexible disk.

What we claim as new and desire to secure by Letters Patent of the United States of America is:—

A packing device for locomotives located between the casing surrounding the connecting rod appliance and the driving wheel shaft of the locomotive and parts belonging thereto, comprising a flexible diaphragm slidable between the casing and the driving wheel shaft, discs provided at both sides of the diaphragm and connected to the casing and a tightening ring at the outer edge of the diaphragm and bearing against the disc, substantially as and for the purposes set forth.

In testimony whereof we affix our signatures in presence of two witnesses:

FREDRIK LJUNGSTRÖM.
ISIDOR BROBERG.

Witnesses:
S. INGRAM,
T. W. FALK.